United States Patent
Hatzl et al.

(10) Patent No.: US 12,546,207 B2
(45) Date of Patent: Feb. 10, 2026

(54) METHOD, ANALYSIS DEVICE AND PUMPING SYSTEM FOR DETECTING AN OIL LEAK IN A BEAM PUMP

(71) Applicant: Siemens Energy Global GmbH & Co. KG, Bayern (DE)

(72) Inventors: Jürgen Hatzl, Grafenschachen (AT); Severin Küberl, Graz (AT); Martin Mayer, Vienna (AT); Stefan Wakolbinger, Graz (AT)

(73) Assignee: Siemens Energy Global GmbH & Co. KG, Bayern (DE)

( * ) Notice: Subject to any disclaimer, the term of this patent is extended or adjusted under 35 U.S.C. 154(b) by 435 days.

(21) Appl. No.: 18/032,181

(22) PCT Filed: Oct. 19, 2021

(86) PCT No.: PCT/EP2021/078915
§ 371 (c)(1),
(2) Date: Apr. 16, 2023

(87) PCT Pub. No.: WO2022/084297
PCT Pub. Date: Apr. 28, 2022

(65) Prior Publication Data
US 2023/0383642 A1 Nov. 30, 2023

(30) Foreign Application Priority Data
Oct. 22, 2020 (EP) ..................................... 20203338

(51) Int. Cl.
*E21B 47/009* (2012.01)
*G06V 10/25* (2022.01)
*G06V 20/52* (2022.01)

(52) U.S. Cl.
CPC ............ *E21B 47/009* (2020.05); *G06V 10/25* (2022.01); *G06V 20/52* (2022.01); *E21B 2200/22* (2020.05)

(58) Field of Classification Search
USPC ....................................... 73/152.61
See application file for complete search history.

(56) References Cited

U.S. PATENT DOCUMENTS

| | | | |
|---|---|---|---|
| 5,245,860 A * | 9/1993 | Chang ..................... | G01M 3/38 73/40 |
| 10,234,354 B2 * | 3/2019 | Badawy .................. | G01M 3/38 |

(Continued)

FOREIGN PATENT DOCUMENTS

CN 109241851 A * 1/2019 ............. G06V 10/25

OTHER PUBLICATIONS

PCT International Search Report and Written Opinion of International Searching Authority mailed Feb. 2, 2022 corresponding to PCT International Application No. PCT/EP2021/078915 filed Oct. 19, 2021.

*Primary Examiner* — Walter L Lindsay, Jr.
*Assistant Examiner* — Warren K Fenwick
(74) *Attorney, Agent, or Firm* — Wolter Van Dyke Davis, PLLC

(57) ABSTRACT

A computer-implemented method for detecting an oil leak in a beam pump, wherein, during pumping movement of the rod linkage through the wellhead, a stroke region is formed, the method including a) capturing images of an image sequence containing at least the stroke region of the rod linkage, b) detecting soiling in the stroke region of the rod linkage in comparison with a known clean state for an image in question of the image sequence, c) ascertaining the position of the detected soiling for an image in question of the image sequence by the associated position of the rod linkage, d) determining the change in the soiling at the (Continued)

ascertained position over at least one pumping cycle from the images of the image sequence, e) checking if the change in the soiling exceeds a predefined limit value, and if applicable, outputting a warning of an oil leak.

19 Claims, 5 Drawing Sheets

(56) References Cited

U.S. PATENT DOCUMENTS

2019/0100990 A1* 4/2019 Chavez Rico ............ G01J 5/10
2019/0203578 A1* 7/2019 Hecht ................... G01S 7/4813

* cited by examiner

FIG 6
FIG 7
FIG 8
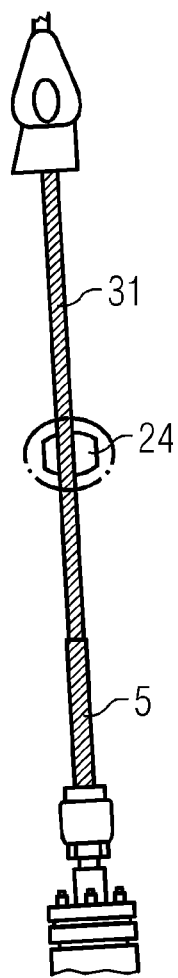
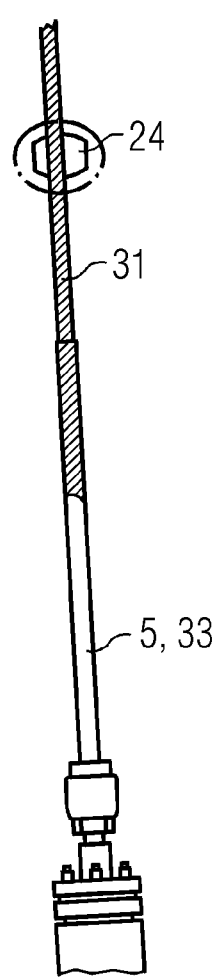
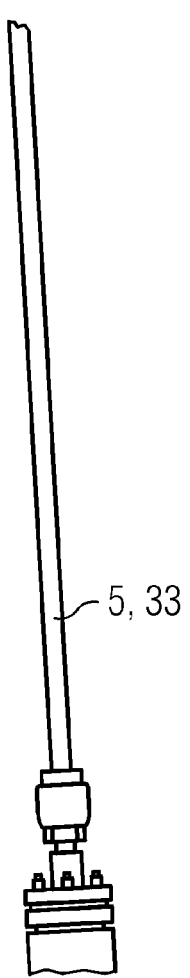

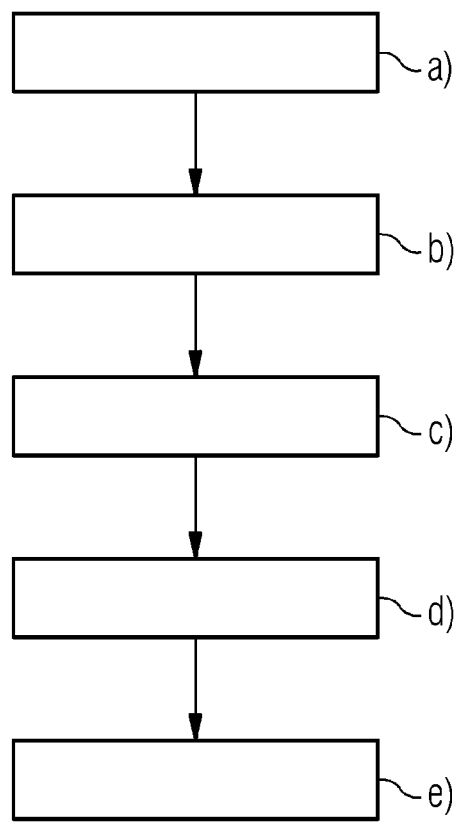

METHOD, ANALYSIS DEVICE AND PUMPING SYSTEM FOR DETECTING AN OIL LEAK IN A BEAM PUMP

CROSS REFERENCE TO RELATED APPLICATIONS

This application is the US National Stage of International Application No. PCT/EP2021/078915 filed 19 Oct. 2021, and claims the benefit thereof. The International Application claims the benefit of European Application No. EP20203338 filed 22 Oct. 2020. All of the applications are incorporated by reference herein in their entirety.

FIELD OF INVENTION

The invention relates to a computer-implemented method, an analysis device and a pumping system for identifying an oil escape in a beam pump, wherein the pump has a pump head which is connected via a linkage to a kinematic converter and the kinematic converter is driven during operation by a motor, and the linkage is inserted into a wellhead located in the ground.

BACKGROUND OF INVENTION

Subsurface pumps are used as production equipment to extract liquids found underground when the deposit pressure is not sufficient for the liquids to reach the surface under their own impetus, or in a sufficient quantity. Usually, they are used to produce oil. Further fields of use are the production of sols and curative waters.

The view of most oilfields is dominated by beam pumps, which because of their appearance and their movement are also referred to as horsehead pumps, nodding donkeys or rocking horses. The actual pumping mechanism—a piston with check valves—is located in its own tubing in the borehole close to the oil-bearing stratum. A continuous up-and-down movement is imparted to the piston by means of a screwable rod of a pumpjack located on the surface.

This is achieved by the so-called horse head. It consists of a circle arc segment arranged at the end of an oscillating beam, on top of which a pair of steel cables or chains is clamped.

The driving is usually carried out electrically. If there are enough energy-containing gases dissolved in the oil, however, part of these gases may be separated from the product on site by means of a degasser and supplied to a gas motor, which drives the pump.

Depending on the pump design and size, the working stroke is from 1 to 5 m. From two and a half to twelve strokes per minute are usual. The beam pump may be used economically up to production depths of about 2500 m. For greater depths, other pumping systems are more suitable because of the large weight of the liquid column to be lifted.

The "Mark II" pump type of the Texan manufacturer Lufkin Industries is particularly suitable for high delivery rates from large depths because of its special movement geometry.

The "Sucker Rod" pump type has a sucker rod, that is to say a steel rod with a typical length of between 25 and 30 feet and a screw thread at both ends, which is used in the oil industry in order to connect the above-ground and downhole components of a reciprocating pump installed in an oil well to one another.

Beam pumps are used to extract oil from deposits in which the pressure is not sufficient for eruptive production. The pumping mechanism consists below ground essentially of a piston with check valves on a tubing, to which an up-and-down movement is imparted above ground by a pumpjack.

The so-called stuffing box ensures a tight seal around the pump rod.

Because of the constant movement, this box may loosen or become worn over time, which can lead to an oil escape and consequent contamination of the surrounding surface.

By directly discovering an incipient oil escape, the damage incurred can be minimized.

In the prior art, there are on the one hand approaches to reduce the likelihood of an oil leak occurring, and on the other hand works aimed at minimizing the damage incurred in the event of an incident.

For example, special stuffing boxes that are automatically retightened by means of springs have been developed.

However, such mechanical solutions are often not sufficiently reliable and the effect may become reduced over the life of the installation.

The effects of an oil leak may, for example, be reduced with special collection containers or suitable concrete foundations.

The installations are therefore additionally checked manually by regular inspection rounds.

Systems for automatically identifying oil leaks are likewise known from the prior art, for example vessels equipped with sensors, which collect escaping liquid and trigger an alarm.

SUMMARY OF INVENTION

It is an object of the invention to provide a method and a device which allow more accurate, rapid and reliable automatic identification of an oil escape of a beam pump.

The object of the invention is achieved with a method of the type mentioned in the introduction, in that during a pumping movement of the linkage through the wellhead, a stroke region is formed which is captured by a camera via an image sequence, and the following method steps are carried out:
  a) capturing images of the image sequence with at least the stroke region of the linkage,
  b) identifying fouling in the stroke region of the linkage in comparison with a known clean state for a respective image of the image sequence,
  c) ascertaining the location of the identified fouling for a respective image of the image sequence with the aid of the respective position of the linkage,
  d) determining the variation of the fouling at the ascertained location over at least one pump cycle from at least one image of the image sequence,
  e) checking whether the variation of the fouling exceeds a predetermined limit value and, if appropriate, emitting a warning of an oil escape.

The invention makes use of the discovery that an oil escape at the linkage due to the movement of the linkage at an inherently existing seal on the wellhead becomes smeared along the rod, and this can be identified straightforwardly by computer-implemented methods.

The result of this is that even minimal creeping oil escapes and streaks on the polished rod of the pump can be detected.

A commercially available color or grayscale camera may be used for this, while expensive thermal cameras generally have to be used in commercial systems.

A commercially available RGB or grayscale camera is thus fitted and aligned so that the insertion point of the polished rod and the largest possible part of the rod itself is captured.

By using a suitable lens, an object resolution of about 1 mm/pixel is intended to be achieved.

The image detail must be selected in such a way that a part of the rod or the entire rod is visible in the image.

Before start-up, the position of the polished rod is roughly annotated manually, such as by drawing a rectangular marking over the visible region of the rod.

Use of the invention achieves the effect that even only a minor oil escape on a polished rod can be detected automatically with a commercially available camera.

Furthermore, an individual detection of an oil escape can be time-referenced within a pumping period.

This substantially improves the prior art insofar as an oil escape can be detected straight away and not be affected by fouling at later instants.

Identification errors and false alarms can therefore be reduced.

On the other hand, relevant fouling may lie just below the ground or above the visible camera detail.

By determining the exact instant within a period, on the one hand the entire polished rod can be observed over time, and on the other hand irrelevant fouling may be identified as such.

In order to further improve the identification rate of an oil escape, an additional plausibility check may be carried out after step c), for example as to whether fouling ascertained in step b) can actually be due to an oil escape at the linkage or whether it is possibly outside fouling which has been caused by people, animals or other machines.

The image sequence may also have images which do not directly follow one another chronologically. In other words, individual or several images of the image sequence that do not contain information relevant to fouling may be deleted, for example in order to save storage capacity in the memory of a computing instrument.

According to one development of the invention, the identification of the fouling takes place by a pixel-by-pixel check being carried out for a respective image of the image sequence against a predefined threshold value or a change of the pixel value.

This achieves the effect that only a change of the fouling is used in order to determine the fouling.

Because oil has viscous and adhesive properties, it sticks to the polished rod, while fouling without oil does not stick.

According to one development of the invention, a reference marking is applied on the linkage and the location of the identified fouling in relation to the location of the reference marking is ascertained by the reference marking being captured at least partially by the camera via images of the image sequence.

Because the camera captures a fixed local region of the pump but the linkage is moved by the pumping movement, the captured image regions need to be associated with one another in order to be able to capture a variation of a region on the rod.

The development achieves the effect that the images of an image sequence can be associated with one another in a straightforward way.

According to one development of the invention, timestamps for the images of the image sequence are respectively captured at the acquisition instant, and the location of the identified fouling in relation to the location of the reference marking is ascertained for the images of the image sequence by means of the timestamps.

This straightforwardly allows association of the image regions in respective images.

According to one development of the invention, the motor is an electric motor and the location of the identified fouling in relation to the position of the linkage is ascertained by the power consumption of the motor being captured with a sensor means during a pumping movement, from which the position of the linkage is ascertained.

This straightforwardly allows association of the image regions in respective images.

According to one development of the invention, a model of the shape and/or texture and the respective time variation thereof is generated, trained and applied on the basis of machine learning when determining the variation of the fouling.

This achieves the effect that the nature of the variation of the detected fouling may be associated with particular fault causes, that is to say classified, by using machine learning.

According to one development of the invention, the location of the identified fouling in relation to the position of the linkage is ascertained by a movement at the linkage or at the kinematic converter being captured by at least one sensor, from which the position of the linkage is ascertained.

This straightforwardly allows association of the image regions in respective images.

The object according to the invention is achieved by a computer program comprising instructions which, when they are executed by a computer, cause the latter to perform the method according to the invention.

The object according to the invention is achieved by an electronically readable data carrier having readable control information stored thereon, which comprises at least the computer program according to the invention and is configured in such a way that it carries out the method according to the invention when the data carrier is used in a computing instrument.

The object according to the invention is achieved by a data carrier signal which transmits the computer program according to the invention.

The object according to the invention is also achieved by an analysis device with a memory of the type mentioned in the introduction, which is adapted, during a pumping movement of the linkage through the wellhead, there is a stroke region which is captured by a camera via an image sequence, and the analysis device is adapted to carry out the method steps according to the invention.

The object according to the invention is also achieved by a pumping system of the type mentioned in the introduction, wherein the pump has a pump head which is connected via a linkage to a kinematic converter and the kinematic converter is driven during operation by a motor, and the linkage is inserted into a wellhead located in the ground, wherein during a pumping movement of the linkage through the wellhead there is a stroke region which is captured by a camera via an image sequence, and an analysis device according to the invention is adapted to perform the steps of the method according to the invention.

BRIEF DESCRIPTION OF THE DRAWINGS

The invention will be explained in more detail below with the aid of an exemplary embodiment which is represented in the appended drawings. In the drawings:

FIG. 6 shows an example of a fouled linkage in a first position, FIG. 7 shows an example of a fouled linkage in a second position, FIG. 8 shows an example of a fouled linkage in a third position, FIG. 9 shows an exemplary embodiment of a flowchart of the method according to the invention.

DETAILED DESCRIPTION OF INVENTION

Figure 1:
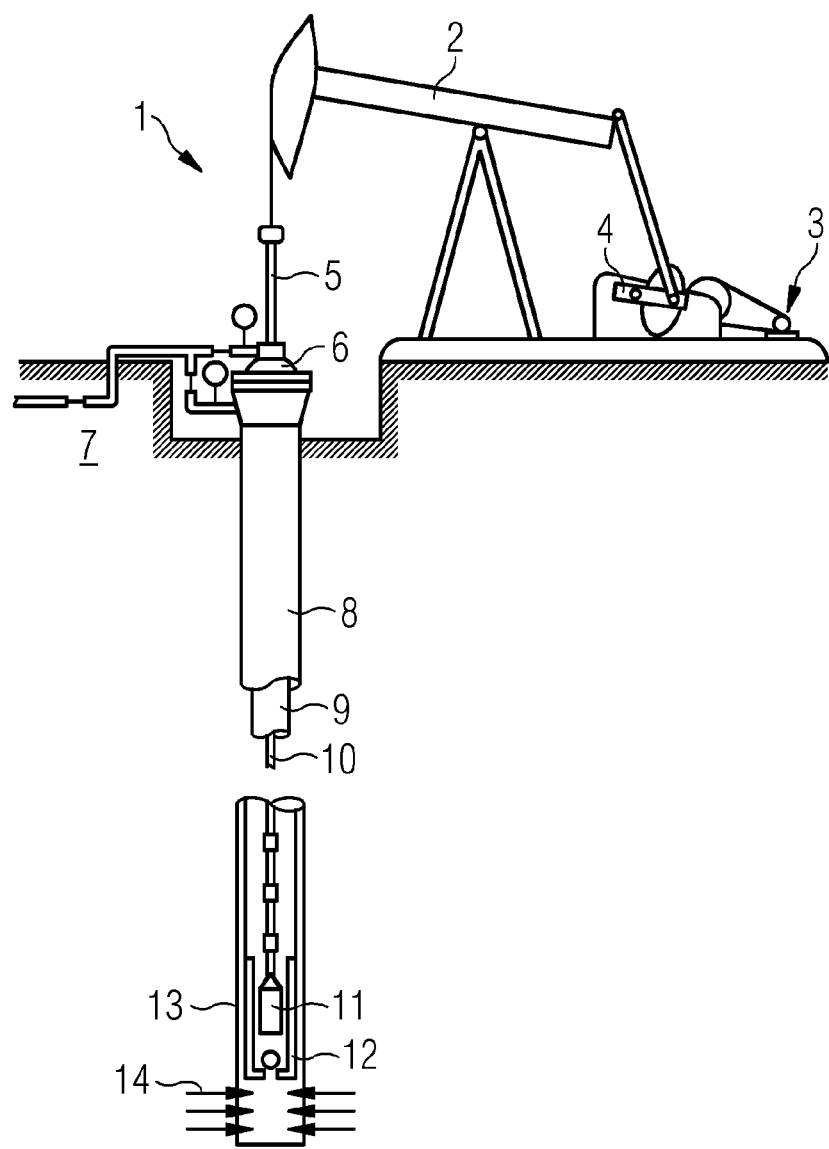
FIG. 1 shows a schematic representation of a pumping system with a beam pump.

FIG. 1 shows an exemplary embodiment of a pumping system 20 with a beam pump 1 of the sucker rod pump type.

The pumping system comprises a pump head, which is connected to a kinematic converter by means of a linkage 5, 10. The linkage 5, 10 forms a so-called "rod string" and extends through a wellhead 6, to which a flow line 7 for leading off a produced medium 14 is connected.

The upper part 5 of the linkage is formed by a polished rod, which extends via a corresponding seal through a wellhead 6.

The lower part 10 of the linkage is mostly located below ground.

Next to the wellhead 6, there is a casing 8 in which a pipe 9, which carries the linkage 5 or 10, extends.

The wellhead 6 encloses the polished rod 5 by means of a seal, so that no oil sticks to the rod in the normal operating state.

Fastened at the lower end of the linkage 10, there is the pump head, which contains a piston 11 in a barrel 12. A movement of the piston 11 leads to pumping of the product medium 14.

The casing 8 is formed in a borehole 13.

The kinematic converter is driven, for example, by a drive machine in the form of an electric motor 3 via a reducing gear 4. The kinematic converter may additionally comprise a hydraulic force amplifier.

The mechanical connection of the kinematic converter takes place in this example via a walking beam 2, although it may vary depending on the type of pump used.

Such kinematic converters are familiar to a person skilled in the art, as is their description in the form of "properties of a kinematic converter" by the transformation function of mechanical movements and forces.

The kinematic converter converts a rotational movement of the motor 3 into a linear movement of the linkage 5, 10.

The properties of the kinematic converter may for example be described by means of lever actions and gear ratios, as well as by means of the electrical drive power and moving masses. It should in this case be noted that the position of an oscillating mass along a rotational movement and the corresponding force action on the linkage 10 are in a temporal relationship, which is referred to as the reference phase angle. For a respective pumping arrangement, a reference phase angle may be determined by using the kinematic principles of mechanics, as is known to a person skilled in the art.

The motor may be an electric motor, which makes it significantly easier to ascertain the location of the identified fouling in relation to the position of the linkage 5, because the power consumption of the motor 3 can thereby be captured with a sensor means during a pumping movement, from which the position of the linkage 5 is ascertained.

For this purpose, a capture means, which is adapted to capture the current consumption and the operating voltage of the individual phases of the electric motor 3 during its operation, may optionally be provided.

This may for example be done using an ammeter or voltmeter, which in particular captures highly time-resolved discrete measurement points with current or voltage values, respectively.

Using the captured current and operating voltage values, the effective power consumption and the apparent power consumption can be determined, from which the current position of the linkage 5, 10 can be deduced.

The way in which a reference phase angle for the kinematic converter can be ascertained with the aid of the properties of the kinematic converter and the power consumption of the motor 3, which describes the relationship between the maximum of the power consumption and the maximum of the force acting on the linkage of the subsurface pump 1, is known to a person skilled in the art.

The way in which a torque profile can be ascertained from the power consumption of the motor 3 with the aid of the properties of the kinematic converter is also known to a person skilled in the art.

Alternatively, the position of the linkage 5 may be ascertained by capturing a movement at the linkage 5, 10 or at the kinematic converter using at least one sensor, such as an inclination sensor, a movement sensor, an acceleration sensor or a magnetic contact sensor.

The method according to the invention may be implemented as a computer program that comprises instructions which, when they are executed by a computer, cause the latter to perform the method according to the invention.

Furthermore, the method according to the invention may be available as an electronically readable data carrier having readable control information stored thereon, which comprises at least the computer program according to the invention and is configured in such a way that it carries out the method according to the invention when the data carrier is used in a computing instrument.

The method according to the invention may also be available as a data carrier signal which transmits the computer program according to the invention.

Figure 2:
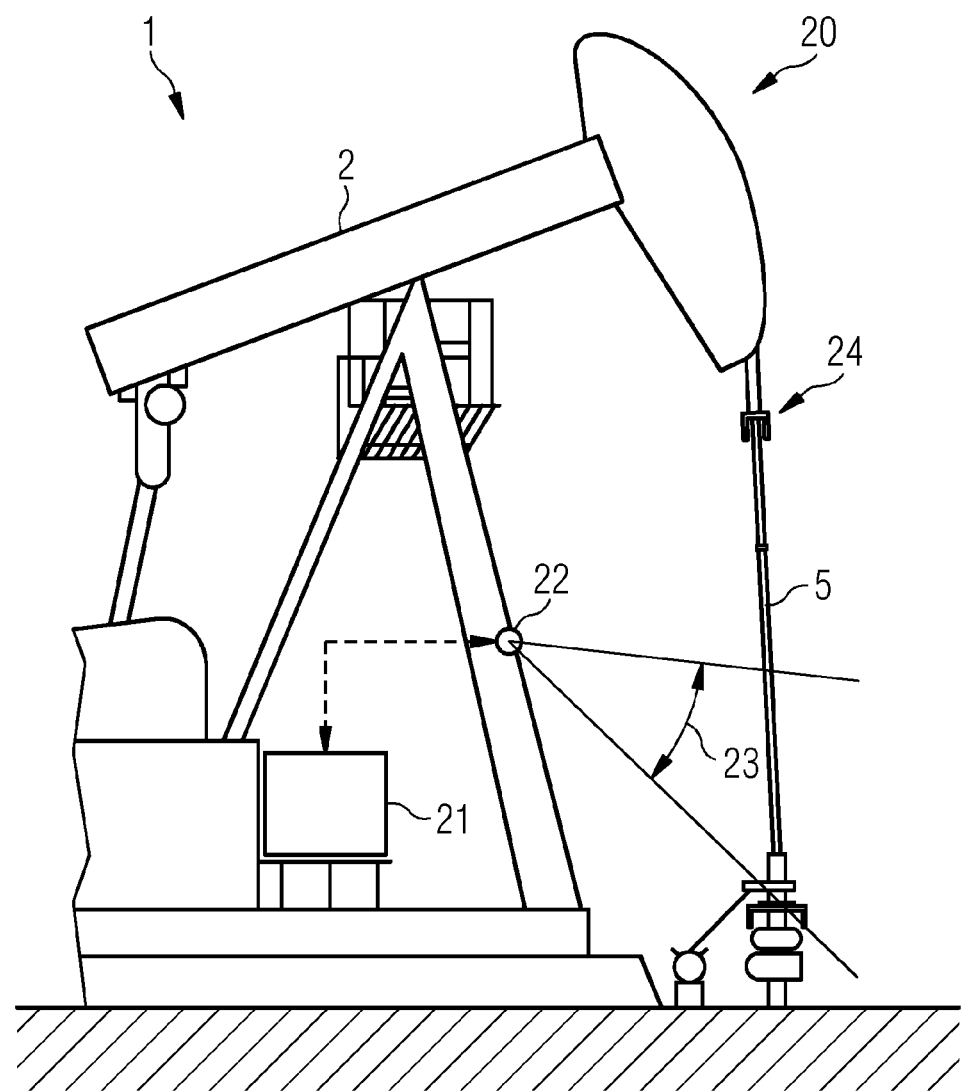
FIG. 2 shows a schematic representation of a pumping system with a beam pump, having a camera for the identification according to the invention of an oil escape.

FIG. 2 shows an exemplary embodiment of a pumping system 20 having a beam pump 1 as well as an analysis device 21 with a processor, a memory and a camera 22, which captures the linkage 5 of the pump 1 in the form of a digital image.

The invention may be configured as a computer-implemented method for identifying an oil escape in a beam pump 1.

The pump 1, as already mentioned in the preceding figure, in this case comprises the pump head, which is connected by means of the linkage 5, 10 to the kinematic converter.

The kinematic converter is driven during operation by the motor 3.

The linkage 5, 10 is inserted into the wellhead 6 located in the ground.

During a pumping movement of the linkage 5, a stroke region is formed by the wellhead 6 which is captured by a camera 22 via an image sequence.

Figure 3:
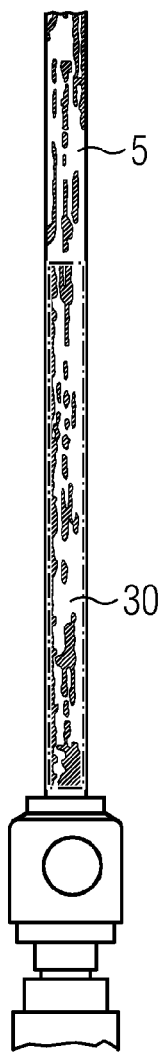
FIG. 3 shows an example of a captured image of a fouled linkage.

FIG. 3 shows an example of a captured image with the oil-fouled polished rod of the linkage 5.

Figure 4:
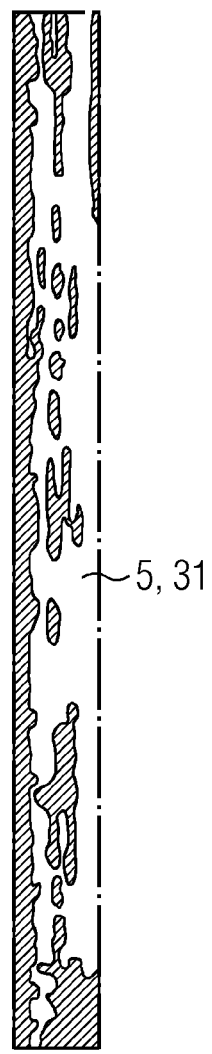
FIG. 4 shows an enlarged image detail of FIG. 3.

A reference image detail 30 may be extracted for the further analysis, as is represented in FIG. 4.

A capture angle 23 is formed by the camera 22 and its optics, which captures an image in a region in which a part of the rod 5 or the entire rod 5 is visible in the image.

In order to capture the position of the linkage 5 simply, in this example a reference marking 24 is applied on the linkage 5.

The location of the identified fouling in relation to the location of the reference marking 24 is ascertained by the reference marking 24 being captured at least partially by the camera 22 via images of the image sequence.

If a corresponding marking on the rod 5 cannot be captured for each image, a timestamp for the acquisition instant may respectively be ascertained for the images of the image sequence.

For the images of the image sequence, the location of the identified fouling in relation to the location of the reference marking 24 can therefore be ascertained by means of the timestamps.

Before start-up, the position of the polished rod 5 may also be annotated only manually, for instance by drawing a rectangular marking over the visible region of the rod.

Figure 5:
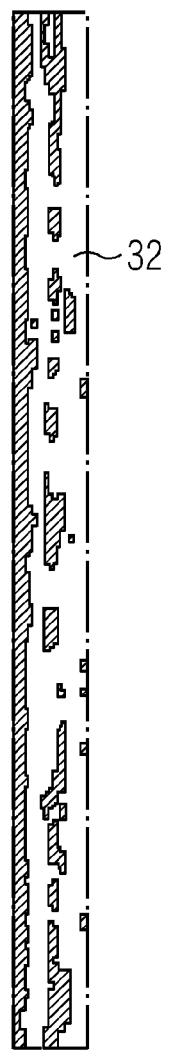
FIG. 5 shows a binarized representation of FIG. 4.

After the capture of an image by the camera 22, the image is binarized, as represented in FIG. 5, for example by applying a predetermined threshold value for the value of each pixel.

Fouling of the rod can now be identified, for example by a pixel-by-pixel check being carried out for a respective image of the image sequence against a predefined threshold value or a change of the pixel value.

The variation of the fouling is then observed over time.

When determining the variation of the fouling, a model of the shape and/or texture and the respective time variation thereof may optionally be generated, trained and applied on the basis of machine learning.

FIG. 6 shows an example of a fouled linkage in a first position, in which the linkage 5 is inserted deep into the wellhead 6.

The reference marking 24 in the form of a pipe clamp is fastened on the polished rod 5.

Visible fouling above the polished rod crosspiece, that is to say the marking 24, is not relevant since it is also present in the normal state, and it is used as reference information.

FIG. 7 shows the arrangement of the preceding figure in a second position, in which the linkage 5 is partly retracted from the wellhead 6 and a clean region 33 of the polished rod 5 can be seen, as is the case for correct operation of the pump 1.

FIG. 8 shows the arrangement of the preceding figure in a third position, in which the linkage 5 is retracted fully from the wellhead 6 and the clean region 33 of the polished rod 5 can be seen, as is the case for correct operation of the pump 1.

FIG. 9 shows an exemplary embodiment of a flowchart of the method according to the invention, in which the following method steps are carried out by the analysis device 21:

a) capturing images of the image sequence with at least the stroke region of the linkage 5,
b) identifying fouling in the stroke region of the linkage 5 in comparison with a known clean state for a respective image of the image sequence,
c) ascertaining the location of the identified fouling for a respective image of the image sequence with the aid of the respective position of the linkage 5,
d) determining the variation of the fouling at the ascertained location over at least one pump cycle from the images of the image sequence,
e) checking whether the variation of the fouling exceeds a predetermined limit value and, if appropriate, emitting a warning of an oil escape.

REFERENCES 1 beam pump
2 walking beam
3 drive machine, motor
4 reducing gear
5 polished rod
6 wellhead
7 flow line
8 casing
9 pipe
10 rod string
11 piston
12 barrel
13 borehole
14 production medium
15 pumping system
21 analysis device
22 camera
23 angle
24 polished rod crosspiece, marking
30 image detail
31 oil-fouled region of the rod
32 binarized image detail
33 clean region of the rod

The invention claimed is:

1. A computer-implemented method for identifying an oil escape in a beam pump, wherein the pump has a pump head which is connected via a linkage to a kinematic converter and the kinematic converter is driven during operation by a motor, and the linkage is inserted into a wellhead located in the ground, characterized in that during a pumping movement of the linkage through the wellhead, a stroke region is formed which is captured by a camera via an image sequence, the method comprising:

a) capturing images of the image sequence with at least the stroke region of the linkage,
b) identifying fouling in the stroke region of the linkage in comparison with a known clean state for a respective image of the image sequence,
c) ascertaining the location of the identified fouling for a respective image of the image sequence with the aid of the respective position of the linkage,
d) determining a variation of the fouling at the ascertained location over at least one pump cycle from the images of the image sequence,
e) checking whether the variation of the fouling exceeds a predetermined limit value and, if appropriate, emitting a warning of an oil escape,
wherein a reference marking is applied on the linkage and the location of the identified fouling in relation to the location of the reference marking is ascertained by the reference marking being captured at least partially by the camera via images of the image sequence; and
wherein timestamps for the images of the image sequence are respectively captured at an acquisition instant, and the location of the identified fouling in relation to the location of the reference marking is ascertained for the images of the image sequence by means of the timestamps.

2. The method as claimed in claim 1,
wherein the identification of the fouling takes place by a pixel-by-pixel check being carried out for a respective image of the image sequence against a predefined threshold value or a change of a pixel value.

3. A computer program stored on a non-transitory computer readable medium, comprising:
instructions stored thereon which, when executed by a computer, cause the computer to perform the method as claimed in claim 1.

4. A non-transitory data carrier, comprising:
the computer program as claimed in claim 3.

5. An electronically readable non-transitory data carrier comprising:
readable control information stored thereon, which comprises at least one computer program configured in such a way that it carries out a method as claimed in claim 1, when the data carrier is used in a computing instrument.

6. An analysis device for identifying an oil escape in a beam pump, wherein the pump has a pump head which is connected via a linkage to a kinematic converter and the kinematic converter is driven during operation by a motor, and the linkage is inserted into a wellhead located in the ground, wherein during a pumping movement of the linkage through the wellhead, there is a stroke region which is captured by a camera via an image sequence,
wherein analysis device is adapted to carry out the method as claimed in claim 1.

7. A pumping system for identifying an oil escape in a beam pump, comprising
a pump having a pump head which is connected via a linkage to a kinematic converter and the kinematic converter is driven during operation by a motor, and the linkage is inserted into a wellhead located in the ground, wherein during a pumping movement of the linkage through the wellhead there is a stroke region which is captured by a camera via an image sequence, and
an analysis device adapted to perform the method as claimed in claim 1.

8. A computer-implemented method for identifying an oil escape in a beam pump, wherein the pump has a pump head which is connected via a linkage to a kinematic converter and the kinematic converter is driven during operation by a motor, and the linkage is inserted into a wellhead located in the ground, characterized in that during a pumping movement of the linkage through the wellhead, a stroke region is formed which is captured by a camera via an image sequence, the method comprising:
a) capturing images of the image sequence with at least the stroke region of the linkage,
b) identifying fouling in the stroke region of the linkage in comparison with a known clean state for a respective image of the image sequence,
c) ascertaining the location of the identified fouling for a respective image of the image sequence with the aid of the respective position of the linkage,
d) determining a variation of the fouling at the ascertained location over at least one pump cycle from the images of the image sequence,
e) checking whether the variation of the fouling exceeds a predetermined limit value and, if appropriate, emitting a warning of an oil escape,
wherein the motor is an electric motor and the location of the identified fouling in relation to a position of the linkage is ascertained by a power consumption of the motor being captured with a sensor means during a pumping movement, from which the position of the linkage is ascertained.

9. A computer program stored on a non-transitory computer readable medium, comprising:
instructions stored thereon which, when executed by a computer, cause the computer to perform the method as claimed in claim 8.

10. An analysis device for identifying an oil escape in a beam pump, wherein the pump has a pump head which is connected via a linkage to a kinematic converter and the kinematic converter is driven during operation by a motor, and the linkage is inserted into a wellhead located in the ground, wherein during a pumping movement of the linkage through the wellhead, there is a stroke region which is captured by a camera via an image sequence,
wherein analysis device is adapted to carry out the method as claimed in claim 8.

11. A pumping system for identifying an oil escape in a beam pump, comprising
a pump having a pump head which is connected via a linkage to a kinematic converter and the kinematic converter is driven during operation by a motor, and the linkage is inserted into a wellhead located in the ground, wherein during a pumping movement of the linkage through the wellhead there is a stroke region which is captured by a camera via an image sequence, and
an analysis device adapted to perform the method as claimed in claim 5.

12. A computer-implemented method for identifying an oil escape in a beam pump, wherein the pump has a pump head which is connected via a linkage to a kinematic converter and the kinematic converter is driven during operation by a motor, and the linkage is inserted into a wellhead located in the ground, characterized in that during a pumping movement of the linkage through the wellhead, a stroke region is formed which is captured by a camera via an image sequence, the method comprising:
a) capturing images of the image sequence with at least the stroke region of the linkage,
b) identifying fouling in the stroke region of the linkage in comparison with a known clean state for a respective image of the image sequence,
c) ascertaining the location of the identified fouling for a respective image of the image sequence with the aid of the respective position of the linkage,
d) determining a variation of the fouling at the ascertained location over at least one pump cycle from the images of the image sequence,
e) checking whether the variation of the fouling exceeds a predetermined limit value and, if appropriate, emitting a warning of an oil escape,
wherein a model of a shape and/or a texture and a respective time variation thereof is generated, trained and applied on the basis of machine learning when determining the variation of the fouling.

13. A computer program stored on a non-transitory computer readable medium, comprising:
instructions stored thereon which, when executed by a computer, cause the computer to perform the method as claimed in claim 12.

14. An analysis device for identifying an oil escape in a beam pump, wherein the pump has a pump head which is connected via a linkage to a kinematic converter and the kinematic converter is driven during operation by a motor, and the linkage is inserted into a wellhead located in the ground, wherein during a pumping movement of the linkage through the wellhead, there is a stroke region which is captured by a camera via an image sequence, wherein analysis device is adapted to carry out the method as claimed in claim 12.

15. A pumping system for identifying an oil escape in a beam pump, comprising a pump having a pump head which is connected via a linkage to a kinematic converter and the kinematic converter is driven during operation by a motor, and the linkage is inserted into a wellhead located in the ground, wherein during a pumping movement of the linkage through the wellhead there is a stroke region which is captured by a camera via an image sequence, and
   an analysis device adapted to perform the method as claimed in claim 6.

16. A computer-implemented method for identifying an oil escape in a beam pump, wherein the pump has a pump head which is connected via a linkage to a kinematic converter and the kinematic converter is driven during operation by a motor, and the linkage is inserted into a wellhead located in the ground, characterized in that during a pumping movement of the linkage through the wellhead, a stroke region is formed which is captured by a camera via an image sequence, the method comprising:
   a) capturing images of the image sequence with at least the stroke region of the linkage,
   b) identifying fouling in the stroke region of the linkage in comparison with a known clean state for a respective image of the image sequence,
   c) ascertaining the location of the identified fouling for a respective image of the image sequence with the aid of the respective position of the linkage,
   d) determining a variation of the fouling at the ascertained location over at least one pump cycle from the images of the image sequence,
   e) checking whether the variation of the fouling exceeds a predetermined limit value and, if appropriate, emitting a warning of an oil escape,
   wherein the location of the identified fouling in relation to a position of the linkage is ascertained by a movement at the linkage or at the kinematic converter being captured by at least one sensor, from which the position of the linkage is ascertained.

17. A computer program stored on a non-transitory computer readable medium, comprising:
   instructions stored thereon which, when executed by a computer, cause the computer to perform the method as claimed in claim 16.

18. An analysis device for identifying an oil escape in a beam pump, wherein the pump has a pump head which is connected via a linkage to a kinematic converter and the kinematic converter is driven during operation by a motor, and the linkage is inserted into a wellhead located in the ground, wherein during a pumping movement of the linkage through the wellhead, there is a stroke region which is captured by a camera via an image sequence,
   wherein analysis device is adapted to carry out the method as claimed in claim 16.

19. A pumping system for identifying an oil escape in a beam pump, comprising a pump having a pump head which is connected via a linkage to a kinematic converter and the kinematic converter is driven during operation by a motor, and the linkage is inserted into a wellhead located in the ground, wherein during a pumping movement of the linkage through the wellhead there is a stroke region which is captured by a camera via an image sequence, and
   an analysis device adapted to perform the method as claimed in claim 7.

\* \* \* \* \*